(12) United States Patent
Mills, III et al.

(10) Patent No.: US 7,720,958 B2
(45) Date of Patent: May 18, 2010

(54) METHOD AND SYSTEM FOR EMBEDDING CORRELATED PERFORMANCE MEASUREMENTS FOR DISTRIBUTED APPLICATION PERFORMANCE DECOMPOSITION

(75) Inventors: W. Nathaniel Mills, III, Coventry, CT (US); LeRoy A. Krueger, Jr., Woodstock, GA (US); Joseph L. Hellerstein, Ossining, NY (US); Srirama Mandyam Krishnakumar, White Plains, NY (US); Mark S. Squillante, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 2347 days.

(21) Appl. No.: 09/875,722

(22) Filed: Jun. 6, 2001

(65) Prior Publication Data

US 2002/0129137 A1    Sep. 12, 2002

Related U.S. Application Data

(60) Provisional application No. 60/274,761, filed on Mar. 9, 2001.

(51) Int. Cl.
 G06F 15/173    (2006.01)
(52) U.S. Cl. ...................... 709/224; 709/246
(58) Field of Classification Search .............. 709/223, 709/224
 See application file for complete search history.

(56) References Cited

U.S. PATENT DOCUMENTS 5,101,402 A    3/1992    Chiu et al.
6,108,700 A    8/2000    Maccabee et al.

(Continued)

FOREIGN PATENT DOCUMENTS

EP    0 812 088 A2    12/1997

OTHER PUBLICATIONS

Bhoedjang et al. "Evaluating Design Alternatives for Reliable Communication on High-Speed Networks." Proceedings of 9h International Conference on Architectural Support for Programming Languages and Operating Systems. pp. 71-81. Cambridge, Mass. 2000.*

(Continued)

*Primary Examiner*—Vivek Srivastava
*Assistant Examiner*—Jeffrey R Swearingen
(74) *Attorney, Agent, or Firm*—Kenneth R. Corsello; Ryan, Mason & Lewis, LLP

(57) ABSTRACT

Techniques for use in accordance with application performance decomposition are provided which take advantage of the communications protocol used to carry a transaction between application components in a distributed computing network. Specifically, the invention extends the communications protocol by embedding data, such as timestamp and duration measurement data, in the protocol itself, rather than extending or altering the application or transaction data carried by the protocol as in existing approaches. Thus, the invention provides natural correlation of interactions of distributed application components on such transactions without modification to the application or transaction data. Because the correlation is performed in-line with the application component interactions, minimal data management overhead is required, and correlated performance decomposition is made possible in real-time for the transaction. Furthermore, subsequent processing stages of the distributed application can interpret the communications protocol to glean processing durations of previous stages in order to make decisions regarding treatment of the transaction.

26 Claims, 6 Drawing Sheets

U.S. PATENT DOCUMENTS

| | | | |
|---|---|---|---|
| 6,247,050 B1 * | 6/2001 | Tso et al. | 709/224 |
| 6,490,620 B1 * | 12/2002 | Ditmer et al. | 709/224 |
| 6,493,832 B1 * | 12/2002 | Itakura et al. | 713/600 |
| 6,502,131 B1 * | 12/2002 | Vaid et al. | 709/224 |
| 6,816,492 B1 * | 11/2004 | Turner et al. | 370/394 |

OTHER PUBLICATIONS

Eric Ladd and Jim O'Donnell et al. Using HTML 3.2, Java 1.1, and CGI: Platinum Edition. Que Publishing, 1996. 253-257.*

Chris Maeda and Brian N. Bershad. "Protocol Service Decomposition for High-Performance Networking." Proceedings of 14th ACM Symposium on Operating Systems Principles. Asheville, NC. Dec. 1993 (published 1994). 244-255.*

Agarwal, D.A. et al. "The Totem Multiple-Ring Ordering and Topology Maintenance Protocol." ACM Transactions on Computer Systems. vol. 16, No. 2, May 1998. pp. 93-132.*

Martin, Milo et al. "Timestamp Snooping : An Approach for Extending SMPs". ACM SIGOPS Operating Systems Review. vol. 34, Issue 5, Dec. 2000. ACM Press. pp. 25-36.*

U.S. Appl. No. 09/637,330, filed Aug. 10, 2000, Ron C. Allan, "Method and Apparatus for Measuring Web Site Performance."

* cited by examiner

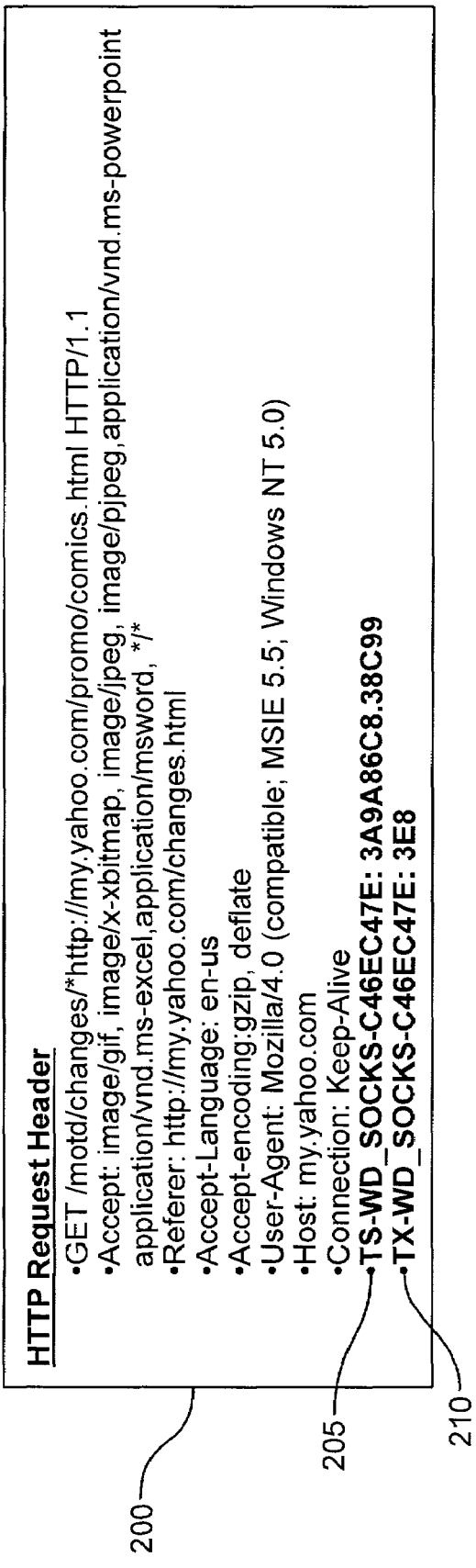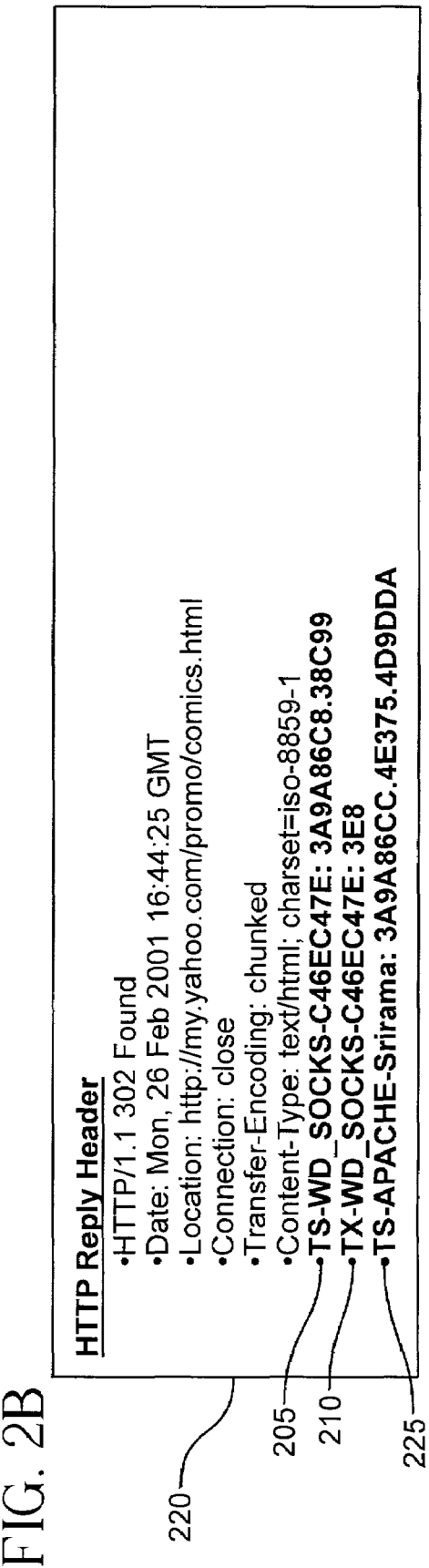

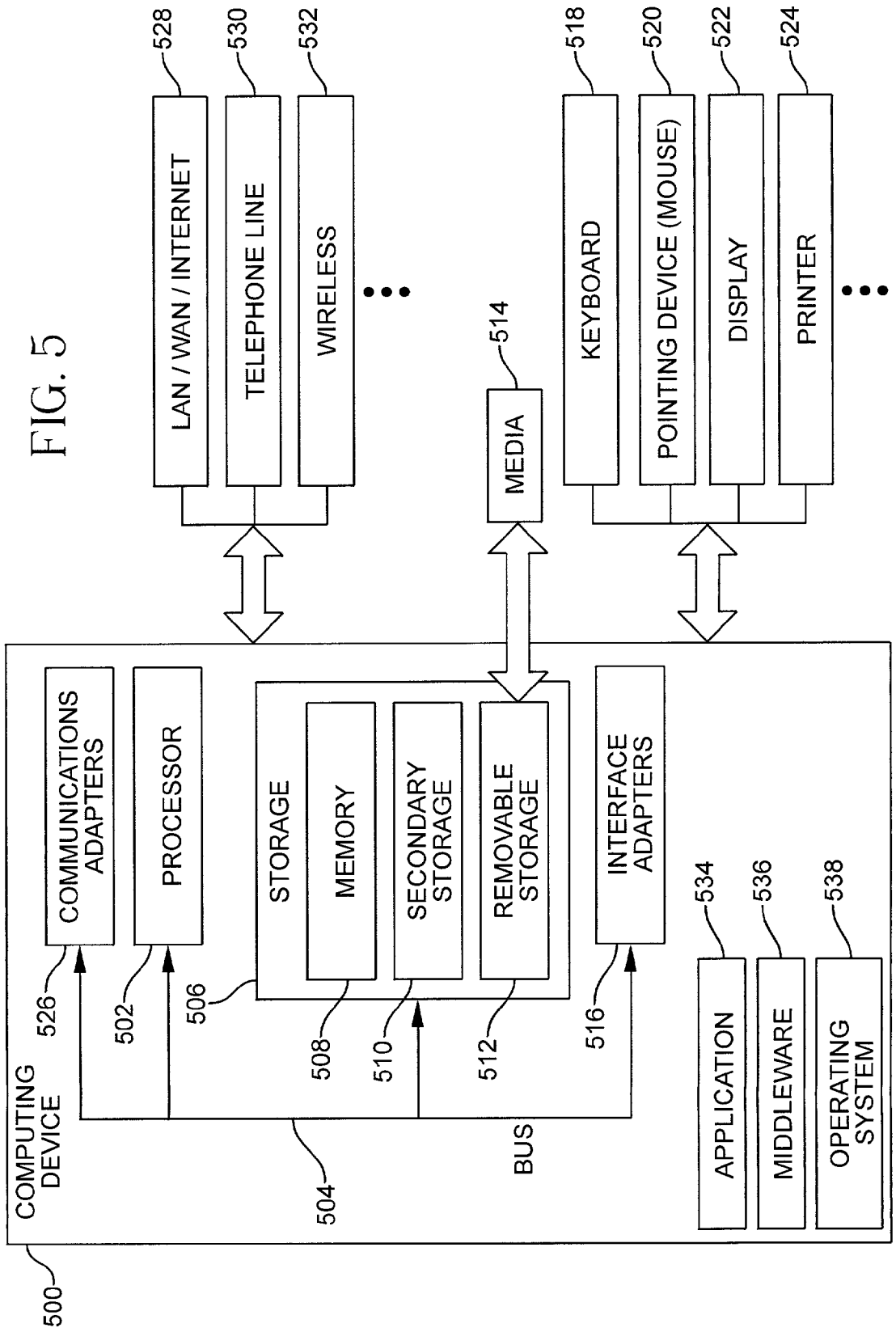

METHOD AND SYSTEM FOR EMBEDDING CORRELATED PERFORMANCE MEASUREMENTS FOR DISTRIBUTED APPLICATION PERFORMANCE DECOMPOSITION

CROSS REFERENCE TO RELATED APPLICATIONS

This application claims priority to the U.S. provisional patent application identified by Ser. No. 60/274,761, filed on Mar. 9, 2001, and entitled "Method and System for Embedding Correlated Performance Measurements for Distributed Application Performance Decomposition," the disclosure of which is incorporated by reference herein.

FIELD OF THE INVENTION

The present invention generally relates to distributed computing networks and, more particularly, to techniques for embedding correlated performance measurements in transactions associated with a distributed application for use in application performance decomposition.

BACKGROUND OF THE INVENTION

Measuring and decomposing performance application transactions often requires distributed instrumentation co-located with application components servicing or transporting the transaction. The application components are implemented on the various computing devices in the distributed network that are involved with (e.g., initiate, process, transfer, etc.) at least a portion of a transaction. The requirement for such co-located instrumentation results in separate streams of performance measurement data that need to be correlated to show the relative contribution of each application component's service time to the overall transaction's response time. Correlation using time of day is difficult as it requires synchronized time sources which tend to drift and which are problematic to keep synchronized over long periods of time. For performance measurements, one cannot easily derive accurate durations by applying functions to timestamps taken from different timing sources. Therefore, accurate duration calculations must occur based on timestamps from the same time source. This causes multiple timestamps and/or durations to be measured at varying locations in the transaction's path whenever a distributed application spans multiple time sources.

Correlation of these timestamps and durations is typically based on tagging them with correlation data which is later used to associate related measurements, see, e.g., U.S. Pat. No. 6,108,700, issued to Maccabee et al. on Aug. 22, 2000 and entitled: "Application End-to-End Response Time Measurement and Decomposition," the disclosure of which is incorporated by reference herein. This introduces data management issues (e.g., storage, movement, and consolidation of distributed duration data) making correlation of distributed applications difficult and time consuming.

Further, techniques are known where embedded JavaScript is added to HTML (HyperText Markup Language) pages to measure how long it takes for the client to receive and render a web page. The system that adds the JavaScript can take timestamps which can later be compared with the information generated by the JavaScript to produce one layer of decomposition. However, intervening application components such as web proxies can not add their perspective of response time, therefore, this conventional method is limited to only a pair of participants (e.g., the client where the JavaScript runs and the server where the JavaScript was embedded). In addition, this embedded JavaScript method introduces JavaScript processing not normally in the HTML page, thus necessitating an alteration in the way the application operates.

Still further, a U.S. patent application identified as Ser. No. 09/637,330, filed on Aug. 10, 2000 and entitled "Method and Apparatus for Measuring Web Site Performance," the disclosure of which is incorporated by reference herein, discloses a technique for extending the application data (payload) with logic to take measurements and report back it's findings. Hence, the application data must be modified to add the measurement and reporting logic. Also, the technique works only at the endpoints (e.g., application server and most notably at the client) of a transaction.

SUMMARY OF THE INVENTION

The present invention provides techniques for use in accordance with application performance decomposition which take advantage of the communications protocol used to carry a transaction between application components in a distributed computing network. Specifically, the invention extends the communications protocol by embedding data, such as timestamp and duration measurement data, in the protocol itself, rather than extending or altering the application or transaction data carried by the protocol as in existing approaches. Thus, the invention provides natural correlation of interactions of distributed application components on such transactions without modification to the application or transaction data. Because the correlation is performed in-line with the application component interactions, minimal data management overhead is required, and correlated performance decomposition is made possible in real-time for the transaction. Furthermore, subsequent processing stages of the distributed application can interpret the communications protocol to glean processing durations of previous stages in order to make decisions regarding treatment of the transaction.

In certain cases, communications protocols are designed for flexibility to adopt new features without breaking existing functions by using tagged data elements in variable length data compartments. These protocols lend themselves to this invention as the invention can add specially tagged measurement data without breaking the existing interpretation mechanisms for the protocol (e.g., the added data is ignored unless the protocol interpreter knows to look for it). One example of a communications protocol that can be used in accordance with the invention is the HyperText Transport Protocol (HTTP), although it is to be understood that the invention is not so limited. Also, while illustrative embodiments are explained below in the detailed description in the context of the World Wide Web, it is to be appreciated that the teachings of the invention may be implemented in other distributed computing environments.

In an illustrative embodiment of a format for embedded measurement data, the invention combines a well-defined keyword prefix with a variable suffix that identifies the timing source, followed by a colon delimiter and whitespace, followed by the timestamp and/or duration information. By "well-defined," it is meant herein that the prefix is commonly defined or known between participating interpreters of the data, so as to allow them to, for example, parse the prefix. The combination of the well-defined prefix with the variable suffix allows multiple, uniquely identified application components to add their performance data to the protocol. Even cases where the applications are not uniquely identified are supported because the lines containing keywords with the well-defined keyword prefix can be sorted by duration to create the "onion-skin" layering of performance decomposition.

As mentioned above, conventional approaches to performance decomposition of distributed applications rely on collecting performance data at distributed locations and later transporting it for correlation using paths separate from the application itself. This results in deferred knowledge of transaction performance. The invention provides techniques to embed the measurement information with the same application it describes so completion of the transaction can occur substantially simultaneous, or at least contemporaneous, with availability of knowledge of the performance characteristics of the transaction. Because the invention provides for carrying correlated performance decomposition with the transaction, no separate storage and forwarding of performance data is required. Furthermore, because the invention captures the timestamp of the application component, a natural correlator within the domain of the application component's time source is available to other systems management monitors (e.g., for performance, capacity, availability, etc.). An optional transaction identifier can also be used as a correlator to other systems management data to extend the performance decomposition further during off-line analysis.

Furthermore, it is to be appreciated that multiple application components can participate by using this invention. That is, the invention allows any number of application components along the transaction's path to add their performance information, thereby providing n levels of performance decomposition. Furthermore, the invention does not necessitate altering the way the application operates. The invention rather extends the protocol carrying the application data, advantageously leaving the application data unaltered. This is significant as secured transmissions (e.g., HyperText Transport Protocol Secured (HTTPS) using Secure Socket Layer (SSL) protocol) or content that has been compressed using GZIP (a Mime-Type defining publicly available data compression) is unaffected by the invention. However, these types of transmissions are problematic for existing methods which attempt to introduce JavaScript to HTML or alter the application data in some way, as mentioned above in the background section, since the HTML may be encrypted or compressed and unable to be altered. Thus, a fundamental difference between the invention and application data-altering approaches, such as the embedded JavaScript method, is that the invention is non-intrusively altering the protocol used to carry the application data, whereas the existing methods are altering the application data itself, imposing special handling by the application. Only the protocol interpreters need be aware of the present invention, and those unaware will simply pass our extensions along without caring about their existence.

This is also the case with the above-mentioned technique which extends the application data or payload with logic to take measurements and report back it's findings. By contrast, the invention leaves the application data alone and instruments the protocol, i.e., the envelope carrying the payload. Another difference is the logic extension approach works only at the endpoints (e.g., application server and most notably at the client), whereas the present invention, as mentioned above, can be used by multiple nodes in the transaction path, each supplying their perspective of performance.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2A is a diagram illustrating an HTTP request header according to an embodiment of the present invention;

FIG. 2B is a diagram illustrating a server-side HTTP reply header according to an embodiment of the present invention;

FIG. 5 is a diagram of an illustrative hardware embodiment according to the invention of a computing device for implementing an application component.

DETAILED DESCRIPTION OF PREFERRED EMBODIMENTS

The present invention will be explained below in the context of the World Wide Web (WWW) as an illustrative distributed computing network, and in the context of the HyperText Transport Protocol (HTTP) as an illustrative communications protocol. However, it is to be understood that the present invention is not limited to any particular computing network or any particular communications protocol. Rather, the invention is more generally applicable to any environment in which it is desirable to have correlated performance decomposition without altering the application or transaction data, and to have completion of a transaction occur substantially simultaneous, or at least contemporaneous, with availability of knowledge of the performance characteristics of the transaction. Thus, the present invention may be used in a distributed application comprising at least two application components separated and interacting via some form of communication. For example, while the form of communication illustratively described below is a network such as the Internet, the form of communication may alternatively be interprocess communication on a platform. One skilled in the art will realize various other scenarios given the inventive teachings disclosed herein.

Figure 1:
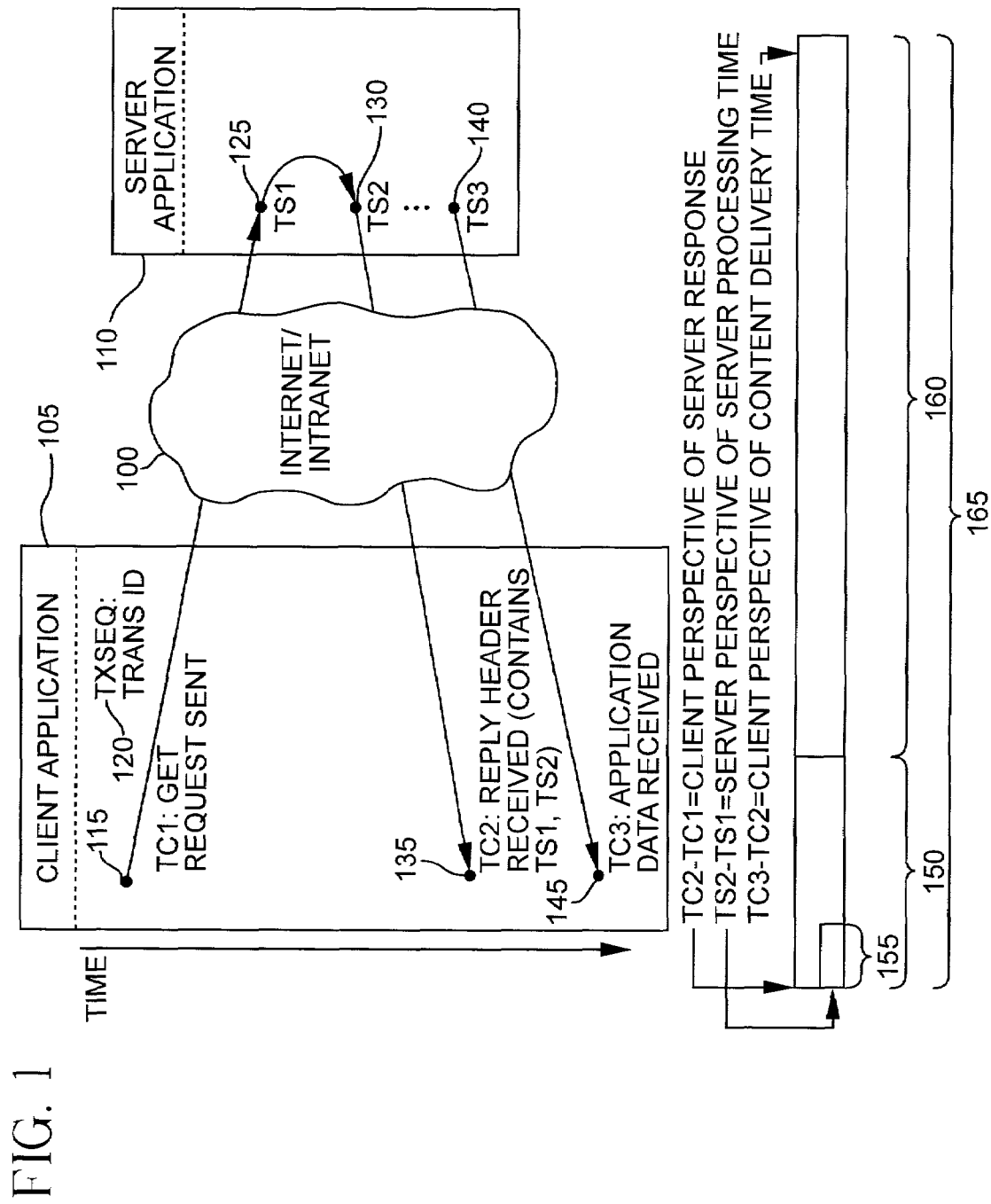
FIG. 1 is a diagram illustrating the present invention in a client application/server application embodiment.

Referring now to FIG. 1, for an illustrative embodiment, assume the network is the Internet or Intranet 100 and the application components are an application running on a client 105 and an application running on a server 110. Again, in an illustrative embodiment, assume the protocol being extended using this invention is HTTP defined by RFC 2098 and RFC 1945, the disclosures of which are incorporated by reference herein, the client application is a web browser (e.g., Netscape, Internet Explorer), and the server application runs on a web server (e.g., IBM's Apache, IIS (Internet Information Server from Microsoft), IHS (IBM HTTP Server)). The distributed application transaction comprises the client application making a request for content from the application server and the application server responding. Performance information is generated using this invention to measure the round trip response time from the client application's perspective, as well as to decompose the response time into the time taken by the server application to service the request and generate it's reply.

For HTTP, there is a defined sequence of information contained in lines of text delimited by line termination character sequences (typically carriage return and linefeed). The HTTP header contains one or more of these lines and is terminated with an empty line. This allows optionally present data to be carried in the header to help manage the underlying TCP (Transmission Control Protocol) socket communications, or to provide caching directives, or to provide contextual information such as the type and version of software being used by the issuer of the header (e.g., browser or server software). Information in these lines typically follows a format containing "keyword: value". Therefore, HTTP interpreters are written to examine lines in the header, testing the keyword and, when appropriate, taking action based on the keyword and/or it's corresponding data (value). Because the WWW has undergone several iterations of HTTP and extensions thereto, HTTP interpreters are written to be flexible with regard to the presence or absence of expected keywords and will not breakdown when unanticipated keywords are presented. The present invention takes advantage of this by adding lines to the HTTP headers to carry performance measurement data, allowing the client to receive the server measurement duration in the HTTP Reply header. This is illustrated below in the context of FIGS. 1, 2A, 2B and 2C.

As shown in FIG. 1, at the time the client application is ready to issue it's request, the client application takes or gets a timestamp 115, labeled TC1, capturing the time of day (e.g., from a clock source accurately tracking time elapsed since the "epoch," which refers to midnight, Jan. 1, 1970, Coordinated Universal Time), and optionally generates a transaction sequence identifier 120, labeled TXSeq, to identify this request from all others occurring within a reasonably long time period (e.g., duplicate transaction identifiers are possible, provided the duplication occurs sufficiently far apart to permit reporting to differentiate them). This information is either added to the HTTP Request Header 200, as shown in FIG. 2A, as additional lines 205 and 210, respectively, for the time stamp (e.g., TS-WD_SOCKS-C46EC47E: 3A9A86C8.38C99) and transaction sequence identifier (e.g., TX-WD_SOCKS-C46EC47E: 3E8), or it is stored pending use by the client application when interpreting the reply forthcoming for this request.

In the exemplary timestamp line 205, the keyword "TS-WD_SOCKS-C46EC47E" serves as a label or identifier of the client that generated this information. The keyword includes a well-defined prefix "TS-" that identifies the HTTP line which contains a timestamp and a variable suffix "WD_SOCKS-C46EC47E" that identifies the timing source from which the timestamp was taken. The colon and subsequent whitespace (blank space) are used to form the above-mentioned "keyword: value" format. "3A9A86C8.38C99" is the hexadecimal timestamp value where the number to the left of the decimal point is the number of seconds since the epoch and the number to the right of the decimal point is the fractional number of seconds since the epoch. Note that the "TS-" in the keyword generally denotes a timestamp.

Further, in the exemplary transaction sequence identifier line 210, "TX-" is a well-defined keyword prefix that identifies the HTTP line which contains a transaction identifier. Thus, while "TS-" generally denotes a timestamp, "TX-" generally denotes a transaction identifier. "WD_SOCKS-C46EC47E" in line 210 is a variable suffix that identifies the specific source (domain) where the transaction identifier is relevant. It is to be understood that in this particular illustrative embodiment, a general-specific identifier is used, where "WD_SOCKS" classifies the source or domain and "C46EC47E" uniquely identifies an instance of this type of source or domain. "3E8" is the hexadecimal value identifying the transaction sequence.

It is to be appreciated that the combination of the well-defined prefix with the variable suffix allows multiple, uniquely identified application components to add their performance data (e.g., timestamp, duration, transaction sequence identifier, etc.) to the protocol. Even cases where the applications are not uniquely identified are supported because the lines containing keywords with the well-defined keyword prefix can be sorted by duration to create the "onion-skin" layering of performance decomposition.

"Onion-skin" layering describes a succession of "contain" relationships, e.g., like the outer skin of an onion contains the rest of the inner onion and each succeeding inner skin is said to contain the skins within it. The analogy here is that a transaction, initiated by a client and traversing through a proxy to a server, may be viewed as having at least three "layers," i.e., the client layer being the outer most layer, the server being the inner most layer, and the proxy (which resides between the client and the server) being the middle layer.

As may typically be the case: (i) the elapsed time (duration) taken by the transaction to traverse from the client through the proxy and the server and back, will take the longest; (ii) the elapsed time taken by the server to process the transaction will be the shortest; and (iii) the elapsed time from receipt by the proxy of the transaction, transmission to the server and back to the proxy will be shorter than (i) but longer than (ii). These timing relationships result because the communications from an outer layer to an inner layer adds time.

Therefore, even if unique identifiers were not employed for each of the "layers" of processing being performed on the transaction, the durations may still be sorted and the relative positioning of the layers with respect to one another may still be understood, e.g., the largest duration being the closest to the transaction initiator, and the shortest duration being closest to the transaction server.

It is to be understood that the additional lines may optionally identify the client as the source that added these lines to the HTTP Request Header to permit later searching and updating of these lines. The HTTP Request containing this HTTP Request Header, along with other application data as required (e.g., POST data), is then sent by the client application 105 through the Internet 100 to the server application 110.

It is to be understood that a main purpose of uniquely identifying the "author" of the line in the HTTP Request Header in the variable suffix is to permit that author to find it's line on the return trip to calculate the duration and update that line to store the duration, as will be explained below. This handles the case where the timestamping source does not have resources to store the initial timestamp and retrieve it from these resources to calculate the duration. The invention uses the header as a "per transaction" storage of the initial timestamp information. In most cases, the "author" of the line in the header is maintaining some information about the transaction, e.g., a proxy may maintain a map of interior sockets/ports to exterior sockets/ports so it can send data retrieved on an exterior socket on the corresponding interior socket, and later retrieve the reply from the interior socket and return it on the appropriate exterior socket. This mapping table may be expanded to hold the initial timestamp and later retrieve it to be used in conjunction with another timestamp to calculate the duration and write a single "completed" line to the reply header.

Upon receipt of the HTTP Request, the server application 110 interprets the HTTP Request, parsing any timestamp or transaction sequence identifier the request contains. The server application also takes a timestamp 125, labeled TS 1, interprets the HTTP Request Header, and begins processing the request. The information parsed from the HTTP Request Header as well as the timestamp are saved for later access when the server application is preparing it's response to the HTTP Request. It is to be understood that the present invention also supports the notion of application components that can act as both a server and a client, e.g., first receiving a request from another client, and then forwarding the request (or a related request) to another server. In this case, the invention may be used for each of these roles, e.g., adding a timestamp and a transaction sequence identifier to it's request, as well as forwarding any existing timestamp and transaction sequence identifier the server received in the new HTTP Request to the other server.

After some period of time, e.g., after the server has determined how to respond to the transaction's request, the server application 110 prepares an HTTP Reply to the HTTP Request containing an HTTP Reply Header 220, as shown in FIG. 2B. This involves adding any timestamp or transaction sequence identifier lines saved from the HTTP Request Header (lines 205 and 210, respectively), as well as taking a second timestamp 130, labeled TS2. The two timestamps (TS1 and TS2) may be used to calculate a duration (e.g., duration=TS2−TS1) and a line 225 (e.g., TS-APACHE-SR-IRAMA: 3A9A86CC. 4E375.4D9DDA) is added to the HTTP Reply Header 220 identifying the server, the timestamp when it's processing began (TS1, which in this example is 3A9A86CC. 4E375) and the duration (which in this example is 4D9DDA).

In the exemplary timestamp line 225, the keyword "TS-APACHE-SRIRAMA" includes the well-defined prefix "TS-" and the variable suffix which serves as an identifier of the timestamp source "APACHE-SRIRA." Note that in this exemplary keyword, "APACHE" infers the type of server and "SRIRAMA" is a unique instance of this type of server. It is to be understood that use of this form of classification is not required by the invention, but rather illustrates a preferred way of classifying the data for reporting purposes, e.g., to report all durations from APACHE-type servers. Further, "3A9A86CC.4E375" in line 225 is the hexadecimal timestamp value where the number to the left of the decimal point is the number of seconds since the epoch and the number to the right of the decimal point is the fractional number of seconds since the epoch. "4D9DDA" is the hexadecimal value representing the duration (TS2−TS1). It is to be understood that the present invention also supports the notion of supplying both timestamps, e.g., TS2 and TS1, in lieu of a timestamp and a duration, since one pair can be derived from the other. The HTTP Reply Header 220 is then sent in the HTTP Reply to the client application 105.

While the invention has been described above with regard to a particular illustrative format, it is to be understood that timestamp and transaction sequence information may be alternatively formatted and combined on the same header line provided the information conveys the concepts of the present invention. For example, in an alternative preferred embodiment, a TS-<identifier> line may be formatted to use decimal numbers and/or with tags identifying the values such as t=<timestamp value> or D=<duration value> or seq=<transaction sequence identifier>. One skilled in the art will realize other formats given the inventive teachings provided herein.

Figure 2C:
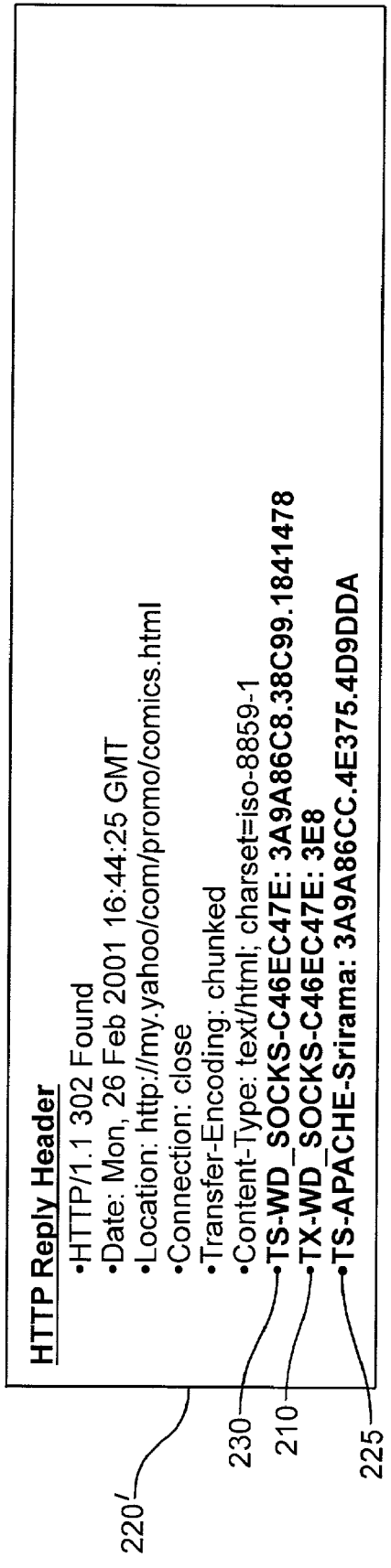
FIG. 2C is a diagram illustrating a client-side HTTP reply header according to an embodiment of the present invention.

Upon receipt of the HTTP Reply containing the HTTP Reply Header 220, the client application 105 takes another timestamp 135, labeled TC2, and parses the HTTP Reply Header for lines containing the timestamp or transaction sequence identifier that the client had previously generated, or those generated by other application components acting on behalf of the transaction. In cases where the client application sent a timestamp line in it's HTTP Request Header 200, the HTTP Reply Header's lines are reviewed to find the timestamp line previously generated by the client application (e.g., using the client identification information on the line(s)). In cases where a request timestamp was generated and held for later processing, it is retrieved for this transaction. A duration may be generated (duration=TC2−TC1) to reflect the client perspective of the transaction's round trip response time. This may be added to the existing line, originally generated by the client, in the HTTP Reply Header 220, thus forming a modified HTTP Reply Header 220', as shown in FIG. 2C. The modified line is denoted as line 230 (e.g., TS-WD_SOCKS-C46EC47E: 3A9A86C8.38C99.1841478) in the HTTP Reply Header 220'. "1841478" denotes the client perspective of the transaction's round trip response time, while the rest of the information in line 230 is the same as in line 205.

It is to be understood that, in cases where no line was previously generated by the client, a new line may be added to the HTTP Reply Header to form the modified Reply Header which may show the timestamp of the client's request and the duration (or, alternatively, the timestamp of the receipt of the response), identification information for the client, and another line containing a transaction sequence identifier. It is also to be understood that the present invention supports the notion of a timestamp, a timestamping source identification and a transaction sequence identifier being added in the same location (e.g., HTTP Header line) or in multiple locations (e.g., multiple HTTP Header lines).

Because there may be additional processing required to generate the complete response to the client's request, the server application may optionally take subsequent timestamps 140 for later association with the transaction, labeled TS3 in FIG. 1. However, because these may occur after the response has been generated to the client, they may be stored for off-line correlation with the transaction performance information contained in the reply. Similarly, upon receipt of subsequent response data from the server application, the client application may optionally take subsequent timestamps 145 for later association with the transaction, labeled TC3 in FIG. 1.

It is to be understood that the transaction sequence identifier may serve as a correlator to be used to search through logs or other data stores where subsequent timestamps, such as TS3 information, are stored. In other words, the header being returned to the client will already have left by the time TS3 is taken. So, if the client later wants to associate it's duration TC3−TC2 with the server side duration TS3−TS2, it needs a correlator to look up this information. The TX-<identifier>: <sequence identifier> may be used for this purpose.

The resulting performance decomposition information contained in the reply may be used by the client to deduce information relating to services rendered by other application component(s) by examining the timestamps and/or durations. For example, the client's perspective of the duration of the request issuance through receipt of the reply may be reflected as TC2−TC1 (labeled 150 in FIG. 1), and the duration of the server application's time to respond to the request as TS2−TS1 (labeled as 155 in FIG. 1). The client may optionally determine the duration required to receive the entire response to it's request as TC3−TC2 (labeled as 160 in FIG. 1), as well as the total transaction response time as TC3−TC1 (labeled as 165 in FIG. 1).

Figure 3:
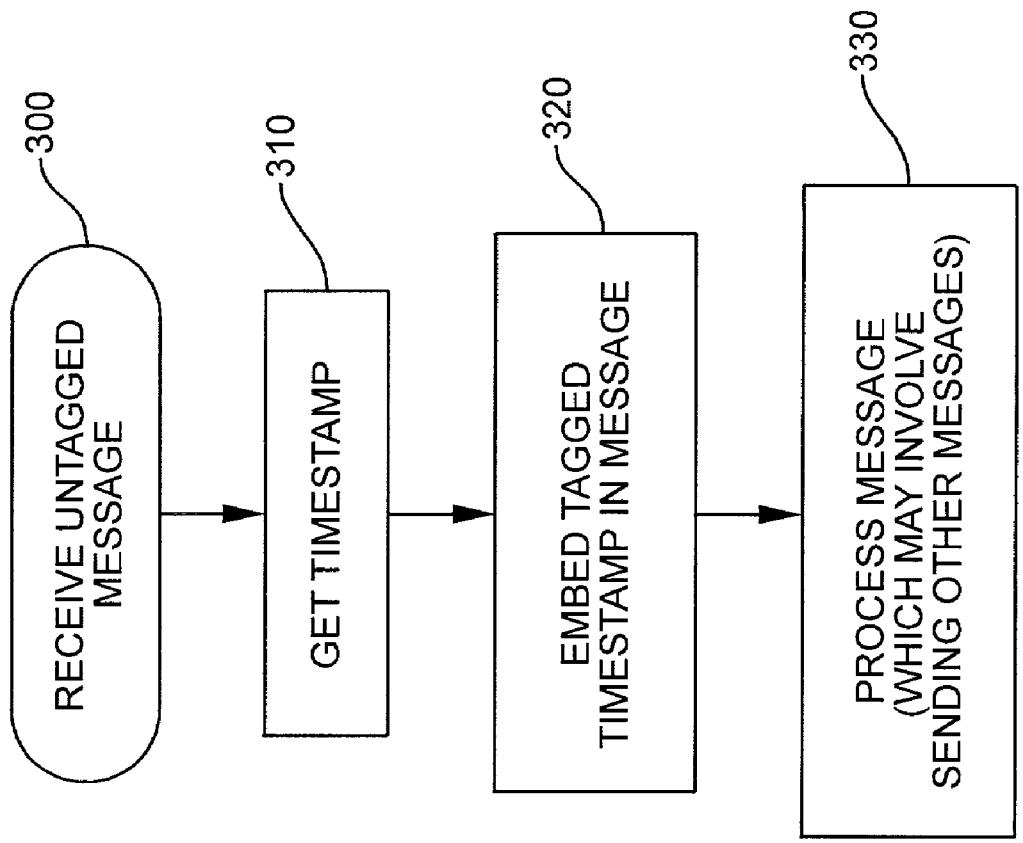
FIG. 3 is a diagram illustrating a method of processing an untagged message according to an embodiment of the present invention.

Referring now to FIG. 3, a general overview of a method for processing an untagged message according to an embodiment of the present invention is shown. An "untagged message," as used herein, refers to a message that does not yet have performance measurement data embedded in the communications protocol in accordance with the present invention, for example, as explained above in the context of FIGS. 1, 2A, 2B and 2C. In step 300, an untagged message is received. This may be, for example, a message for which processing has not yet begun within the "instrumented component." An "instrumented component" refers to the component in the transaction's path that supplies the timestamp information. For example, a proxy may be used in front of the browser on the client machine to add timestamps since the browser's commercial code may not be able to be modified. The untagged message is then received by this proxy (having been generated by the browser) and the proxy, being an instrumented component, adds the timestamp information to the header before sending it on it's way toward the server. WD_SOCKS may be such a proxy running on the client.

In step 310, a local timestamp is obtained, such as from a system clock. In step 320, a tag is constructed that includes the timestamp information and the identity of the processing element that is adding the tag. The tag may preferably have the above-described format of "keyword: value," e.g., TS-WD_SOCKS-C46EC47E: 3A9A86C8.38C99 as in FIG. 2A. The tag may also include a transaction sequence identifier, e.g.,TX-WD_SOCKS-C46EC47E: 3E8. This tag is added to the message, i.e., embedded into the communications protocol as explained above. In step 330, processing is initiated for the message. This may involve sending the tag augmented message to other machines.

Figure 4:
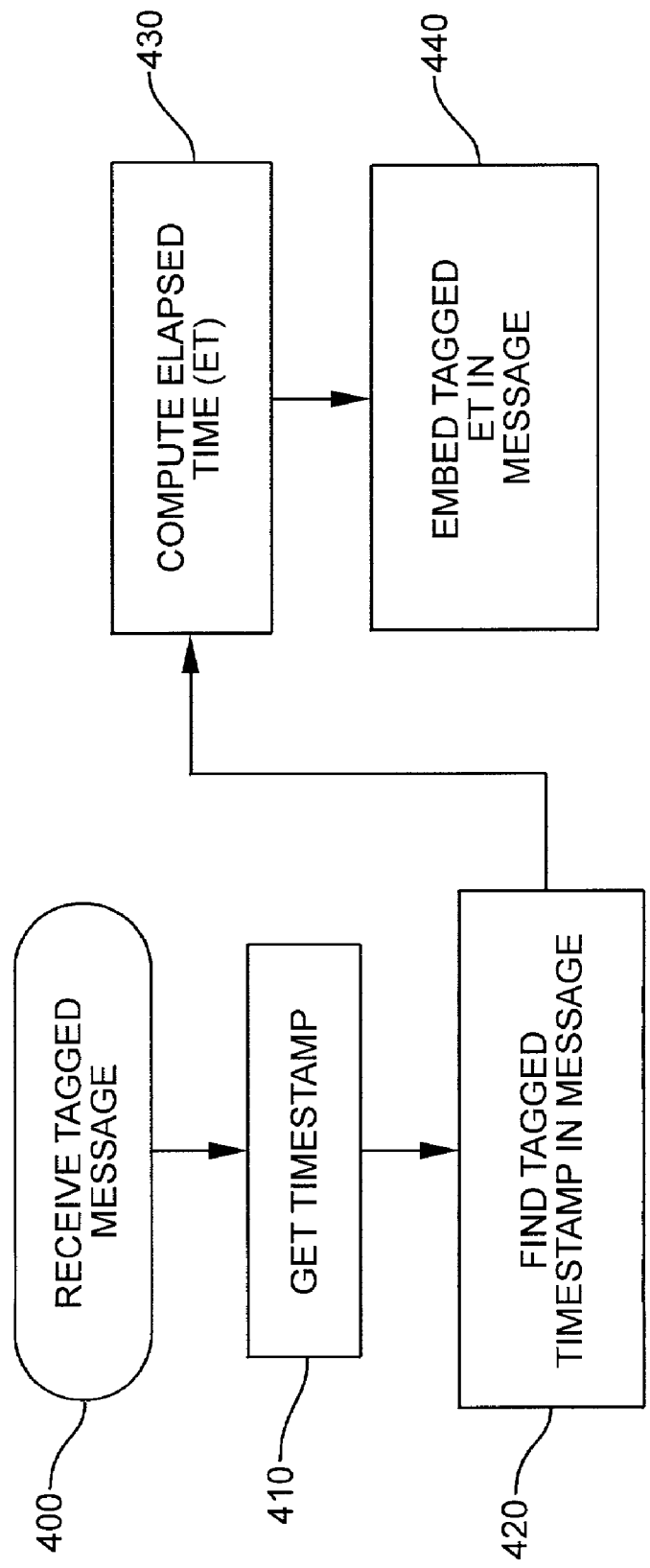
FIG. 4 is a diagram illustrating a method of processing a tagged message according to an embodiment of the present invention.

FIG. 4 illustrates a general overview of a method for processing a tagged message according to an embodiment of the present invention. A "tagged message," as used herein, refers to a message that has performance measurement data embedded in the communications protocol in accordance with the present invention, for example, as explained above in the context of FIGS. 1, 2A, 2B and 2C. In step 400, a tagged message is received. In step 410, a local timestamp is obtained, such as from a system clock. In step 420, the tag for the component processing the message is located, and the previously embedded timestamp is extracted. In step 430, the elapsed time for processing the message is computed by subtracting the extracted timestamp from that obtained in step 410. In step 440, the elapsed time is tagged and embedded in the message. An example of such a tag may be TS-APACHE-SRIRAMA: 3A9A86CC. 4E375.4D9DDA, as shown in FIG. 2B.

FIG. 5 is a block diagram of a computing device or system, such as a workstation or server, wherein the present invention may be practiced. The computing device shown in FIG. 5 serves as an example of a client computer system upon which at least a portion of a client application (e.g., 105 in FIG. 1) may be executed, an example of a server computer system upon which at least a portion of a server application (e.g., 110 in FIG. 1) may be executed, as well as an example of any other computing device in a network employing the teachings of the present invention. The environment of FIG. 5 comprises a single representative computing device 500, such as a personal computer, laptop, workstation, hand-held computer, information appliance, etc., including optionally present, related peripheral devices. The workstation 500 includes a microprocessor 502 or equivalent processing capability and a bus 504 to connect and enable communication between the microprocessor 502 and the components of the computing device 500 in accordance with known techniques. Note that in some computing devices there may be multiple processors incorporated therein.

The microprocessor 502 communicates with storage 506 via the bus 504. Memory 508, such as Random Access Memory (RAM), Read Only Memory (ROM), flash memory, etc., is directly accessible while secondary storage device 510, such as a hard disk, and removable storage device 512, such as a floppy diskette drive, CD ROM drive, tape storage, etc., is accessible with additional interface hardware and software as is known and customary in the art. The removable storage device 512 has associated therewith an appropriate type of removable media 514, such as a diskette, CD, tape reel or cartridge, solid state storage, etc., that holds computer useable data and is a form of computer useable medium. Note that a computing device 500 may have multiple memories (e.g., RAM and ROM), secondary storage devices, and removable storage devices (e.g., floppy drive and CD ROM drive).

The computing device 500 typically includes a user interface adapter 516 that connects the microprocessor 502 via the bus 504 to one or more interface devices, such as a keyboard 518, a mouse or other pointing device 520, a display 522 (such as a CRT monitor, LCD screen, etc.), a printer 524, or any other user interface device, such as a touch sensitive screen, digitized entry pad, etc. Note that the computing device 500 may use multiple user interface adapters in order to make the necessary connections with the user interface devices.

The computing device 500 may also communicate with other computing devices, computers, workstations, etc., or networks thereof through a communications adapter 526, such as a telephone, cable, or wireless modem, Integrated Services Digital Network (ISDN) adapter, Digital Subscriber Line (DSL) adapter, Local Area Network (LAN) adapter, or other communications channel. This gives the computing device direct access to networks 528 (LANs, Wide Area Networks (WANs), the Internet, etc.), telephone lines 530 that may be used to access other networks or computers, wireless networks 532, such cellular telephone networks, and other communication mechanisms. Note that the computing device 500 may use multiple communication adapters for making the necessary communication connections (e.g., a telephone modem card and a Cellular Digital Packet Data (CDPD)). The computing device 500 may be associated with other computing devices in a LAN or WAN, or the computing device can be a client or server in a client/server arrangement with another computer, etc.

The computing device 500 provides the environment where Operating System 534, Middleware 536, and Application 538 software execute tasks and may communicate with software on the same or on other computing devices. All these configurations, as well as the appropriate communications hardware and software, are known in the art.

As will be understood by one of ordinary skill in the art, computer programs such as described herein (e.g., Operating System 534, Middleware 536, and/or Application 538 software) are typically distributed as part of a computer program product that has a computer useable media or medium containing the program code. Therefore, "media," "medium," "computer useable medium," or "computer useable media," as used herein, may include a diskette, a tape, a compact disc, an integrated circuit, a programmable logic array (PLA), a remote transmission over a communications circuit, a remote transmission over a wireless network such as a cellular network, or any other medium useable by computers with or without proper adapter interfaces. Note that examples of a computer useable medium include but are not limited to palpable physical media, such as a CD ROM, diskette, hard drive and the like, as well as other non-palpable physical media, such as a carrier signal, whether over wires or wirelessly, when the program is distributed electronically. Note also that "servlets" or "applets" according to JAVA technology available from Sun Microsystems of Mountain View, Calif., would be considered computer program products.

Although the enabling instructions might be "written on" on a diskette or tape, "stored in" an integrated circuit or PLA, "carried over" a communications circuit or wireless network, it will be appreciated, that for purposes of the present invention described herein, the computer useable medium may be referred to as "bearing" the instructions, or the instructions (or software) may be referred to as being "on" the medium. Thus, software or instructions "embodied on" a medium is intended to encompass the above and all equivalent ways in which the instructions or software can be associated with a computer useable medium.

For simplicity, the term "computer program product" is used to refer to a computer useable medium, as defined above, which bears or has embodied thereon any form of software or instructions to enable a computer system (or multiple cooperating systems) to operate according to the above-identified invention.

The term "data structure" refers to a particular organization of meaningful data values that can be used in a predetermined fashion. For example, a network packet has a variety of different data elements that are used and accessed by communications networks and computer nodes for transporting the packet between different computer systems. The packet is a data structure and has a tangible embodiment in a computer useable medium when stored in a file, when loaded into system memory, when transported across a communications network, etc., in the same fashion as a computer program product.

It will be likewise appreciated that the computer hardware upon which the invention is effected contains one or more processors, operating together, substantially independently, or distributed over a network, and further includes memory for storing the instructions and calculations necessary to perform the invention.

Those skilled in the art will recognize that a system according to the present invention may be created in a variety of different ways known in the art. For example, a general purpose computing device as described in the context of FIG. 5 may be configured with appropriate software so that the computing device functions as described herein. Furthermore, discrete electronic components may be used to create a system that implements all or part of the functionality. Finally, note that combinations of multiple computing devices running appropriate software or discrete electrical components can be used in like fashion. Essentially, the hardware is configured (whether by software, custom-designed, etc.) to perform the functional elements making up the present invention.

It is to be appreciated that the WWW is considerably more complex than the example cited above with proxies and caching servers helping to extend the servicing and transport of transactions. Because the present invention identifies the time source and associates it with it's timestamp and duration information, multiple application components can employ the invention to add their duration measurements, resulting in multiple lines being added to the transactions HTTP header as it flows from the initiating client through these application components and is eventually returned. Examination of the header can occur at any point along the transactions path by application components to glean the invention's performance information. Specifically, during the return portion of the transaction path, an application component can review preceding application components durations and make decisions for the services it intends to render. Upon receipt of the transaction by the transaction's originator, the response time of the transaction can be measured as well as the decomposition into the durations of all preceding participating application components by examining the HTTP Reply header for the invention's keywords.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use at one or more application components of a distributed application in which at least a portion of the distributed application is executed, the method comprising the steps of:
   embedding, at one of the application components, data relating to the performance of the distributed application in a communications protocol used to carry transaction data relating to the execution of the distributed application, wherein the performance data is embedded in the communications protocol without requiring alteration of the transaction data, and further wherein the performance data comprises a time stamp and duration measurement data; and
   transmitting, from the application component, the embedded performance data with the transaction data to one or more other application components so that correlated application performance data is obtained at the one or more other application components with the transaction data;
   wherein, in accordance with at least one of the one or more other application components that obtain the embedded performance data with the transaction data, the following steps are performed:
   processing the performance data in association with other performance data relating to the one or more other application components;
   embedding at least a portion of results associated with the processed performance data in the communications protocol used to carry transaction data relating to the execution of the distributed application; and
   transmitting the embedded results with the transaction data to one or more other application components.

2. The method of claim 1, further comprising, in accordance with at least one of the one or more other application components that obtain the embedded performance data with the transaction data, the steps of:
   embedding data relating to the performance of the distributed application at the at least one other application component in the communications protocol used to carry transaction data relating to the execution of the distributed application, wherein the performance data is embedded in the communications protocol without requiring alteration of the transaction data; and
   transmitting the embedded performance data with the transaction data to one or more other application components.

3. The method of claim 2, wherein the transmitting step further comprises the at least one other application component transmitting: (i) at least a portion of the performance data embedded thereby; and (ii) at least a portion of the performance data embedded by the one application component.

4. The method of claim 1, wherein the performance data comprises elapsed times associated with transactions relating to the distributed application.

5. The method of claim 1, wherein the performance data further comprises an identifier associated with an application component and an identifier associated with a transaction relating to the distributed application.

6. The method of claim 1, wherein a format for the performance data comprises a "keyword: value" format.

7. The method of claim 6, wherein the keyword comprises a prefix that identifies a data format and a variable suffix that identifies an application component as one of a timing source and a transaction sequencing source.

8. The method of claim 6, wherein the value comprises at least one of timestamp and duration information.

9. The method of claim 1, wherein n application components may embed and transmit performance data in the communications protocol so as to provide n levels of performance decomposition.

10. The method of claim 1, wherein the correlated performance data is reported to a performance measurement system.

11. The method of claim 1, wherein the distributed application is executed on the World Wide Web.

12. The method of claim 1, wherein the communications protocol is the HyperText Transport Protocol.

13. Apparatus for use at one or more application components of a distributed application in which at least a portion of the distributed application is executed, the apparatus comprising:
 a memory;
 at least one processor coupled to the memory and operative to: (i) embed, at one of the application components, data relating to the performance of the distributed application in a communications protocol used to carry transaction data relating to the execution of the distributed application, wherein the performance data is embedded in the communications protocol without requiring alteration of the transaction data, and further wherein the performance data comprises a time stamp and duration measurement data; and (ii) transmit, from the application component the embedded performance data with the transaction data to one or more other application components so that correlated application performance data is obtained at the one or more other application components with the transaction data;
 wherein, in accordance with at least one of the one or more other application components that obtain the embedded performance data with the transaction data, the following operations are performed: processing the performance data in association with other performance data relating to the one or more other application components; embedding at least a portion of results associated with the processed performance data in the communications protocol used to carry transaction data relating to the execution of the distributed application; and transmitting the embedded results with the transaction data to one or more other application components.

14. The apparatus of claim 13, further comprising at least another processor operative to, in accordance with at least one of the one or more other application components that obtain the embedded performance data with the transaction data: embed data relating to the performance of the distributed application at the at least one other application component in the communications protocol used to carry transaction data relating to the execution of the distributed application, wherein the performance data is embedded in the communications protocol without requiring alteration of the transaction data; and transmit the embedded performance data with the transaction data to one or more other application components.

15. The apparatus of claim 14, wherein the transmitting step further comprises the at least one other application component transmitting: at least a portion of the performance data embedded thereby; and at least a portion of the performance data embedded by the one application component.

16. The apparatus of claim 13, wherein the performance data comprises elapsed times associated with transactions relating to the distributed application.

17. The apparatus of claim 13, wherein the performance data further comprises an identifier associated with an application component and an identifier associated with a transaction relating to the distributed application.

18. The apparatus of claim 13, wherein a format for the performance data comprises a "keyword: value" format.

19. The apparatus of claim 18, wherein the keyword comprises a prefix that identifies a data format and a variable suffix that identifies an application component as one of a timing source and a transaction sequencing source.

20. The apparatus of claim 18, wherein the value comprises at least one of timestamp and duration information.

21. The apparatus of claim 13, wherein n application components may embed and transmit performance data in the communications protocol so as to provide n levels of performance decomposition.

22. The apparatus of claim 13, wherein the correlated performance data is reported to a performance measurement system.

23. The apparatus of claim 13, wherein the distributed application is executed on the World Wide Web.

24. The apparatus of claim 13, wherein the communications protocol is the HyperText Transport Protocol.

25. An article of manufacture for use at one or more application components of a distributed application in which at least a portion of the distributed application is executed, comprising a machine readable storage medium containing one or more programs which when executed implement the step of:
 embedding, at one of the application components, data relating to the performance of the distributed application in a communications protocol used to carry transaction data relating to the execution of the distributed application, wherein the performance data is embedded in the communications protocol without requiring alteration of the transaction data, and further wherein the performance data comprises a time stamp and duration measurement data, such that the embedded performance data may be transmitted with the transaction data to one or more other application components so that correlated application performance data may be obtained at the one or more other application components with the transaction data,
 wherein, in accordance with at least one of the one or more other application components that obtain the embedded performance data with the transaction data, the following steps are performed:
 processing the performance data in association with other performance data relating to the one or more other application components;
 embedding at least a portion of results associated with the processed performance data in the communications protocol used to carry transaction data relating to the execution of the distributed application; and
 transmitting the embedded results with the transaction data to one or more other application components.

26. A method for use at one or more application components of a distributed application in which at least a portion of the distributed application is executed, the method comprising the step of:

adding, at one of the application components, data relating to the performance of the distributed application to a communications protocol used to carry transaction data relating to the execution of the distributed application, wherein the added performance data comprises a time stamp and duration measurement data, such that the added performance data may be transported with the transaction data to one or more other application components so that correlated application performance data may be obtained at the one or more other application components with the transaction data;

wherein, in accordance with at least one of the one or more other application components that obtain the added performance data with the transaction data, the following steps are performed:

processing the performance data in association with other performance data relating to the one or more other application components;

adding at least a portion of results associated with the processed performance data in the communications protocol used to carry transaction data relating to the execution of the distributed application; and transmitting the added results with the transaction data to one or more other application components.

* * * * *